United States Patent

Hachtel

[15] 3,641,622
[45] Feb. 15, 1972

[54] DEVICE FOR CONNECTING CURTAIN RAILS END TO END

[72] Inventor: Wilhelm Hachtel, 6994 Niederstetten, Germany

[22] Filed: Feb. 19, 1969

[21] Appl. No.: 800,670

[30] Foreign Application Priority Data

Feb. 29, 1968 Germany ............. P 17 29 929.5

[52] U.S. Cl. ................................. 16/95, 16/96
[51] Int. Cl. ................................. A47h 1/04
[58] Field of Search ........... 287/1, 2, 126, 119, 189.36, 287/127, 134, 20.92 C, 23, 56; 85/81, 83; 16/95, 96

[56] References Cited

UNITED STATES PATENTS

| | | | |
|---|---|---|---|
| 77,337 | 4/1868 | Tyler | 287/20.92 A |
| 449,777 | 4/1891 | Hall | 287/189.36 |
| 2,240,268 | 4/1941 | Ruddy | 287/20.92 E |
| 2,911,246 | 11/1959 | Caruso | 287/108 |
| 3,178,780 | 4/1965 | Booher | 287/20.92 C |
| 3,213,494 | 10/1965 | Mayers et al. | 85/80 X |
| 3,308,998 | 3/1967 | Oppasser et al. | 285/DIG. 22 |
| 3,331,095 | 7/1967 | Hachtel | 16/96 |
| 3,369,265 | 2/1968 | Halberstadt et al. | 287/126 X |

FOREIGN PATENTS OR APPLICATIONS 1,129,668  5/1962  Germany ..................... 16/96

Primary Examiner—Thomas F. Callaghan
Assistant Examiner—Wayne L. Shedd
Attorney—Milton Robert Kestenbaum

[57] ABSTRACT

One or more molded plugs or fingers are nailed through an axial passage to the end of one curtain rail. The plugs fit for rigid attachment into channels opening at the end of a second curtain rail. As a result, the curtain rails can be connected end to end.

9 Claims, 27 Drawing Figures

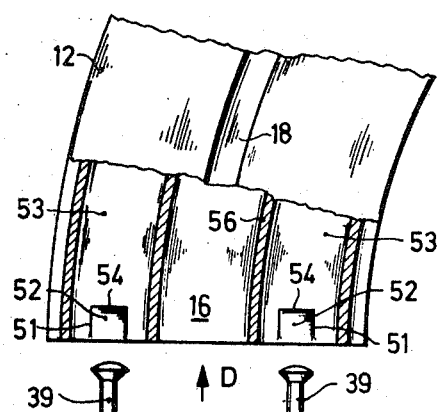
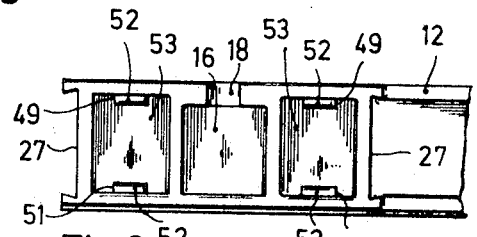
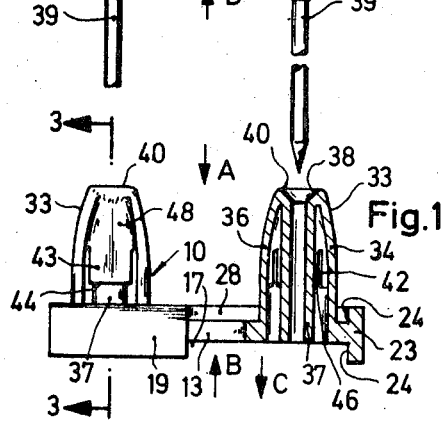
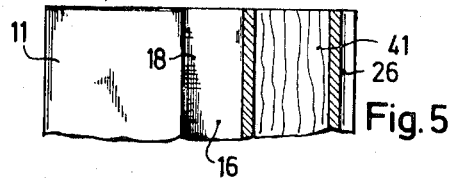
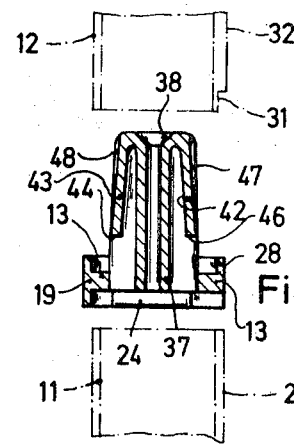
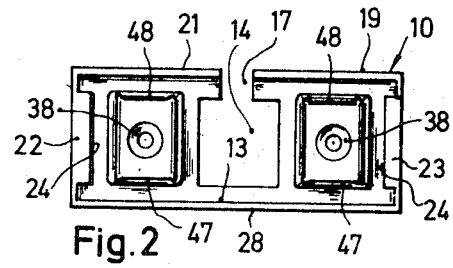
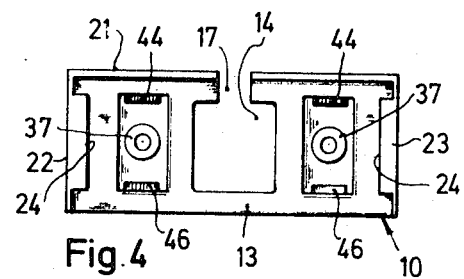
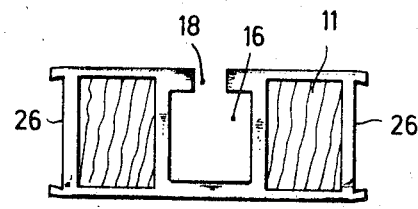

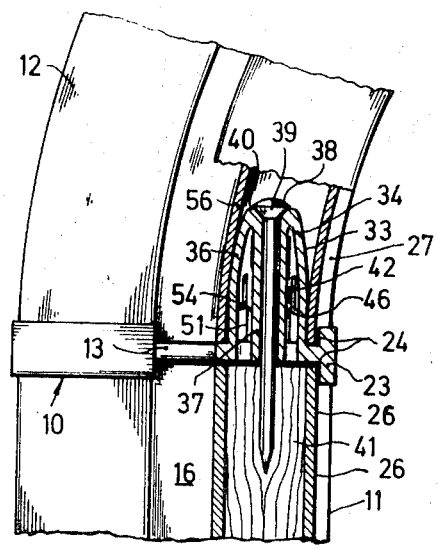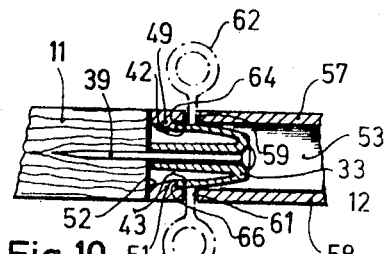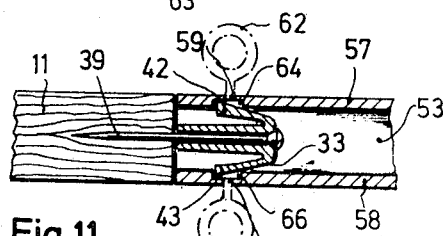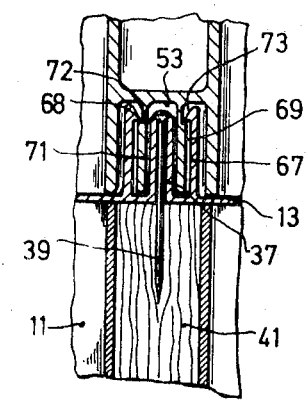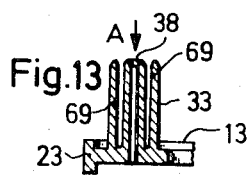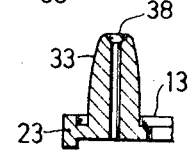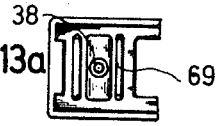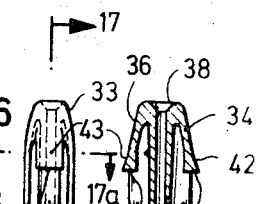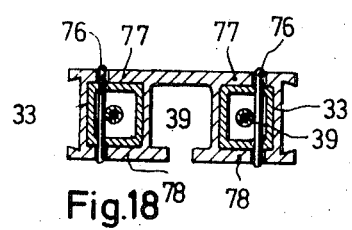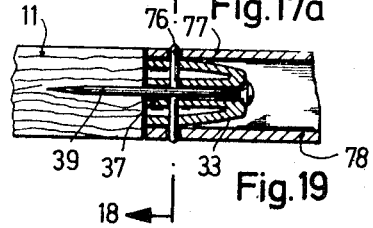

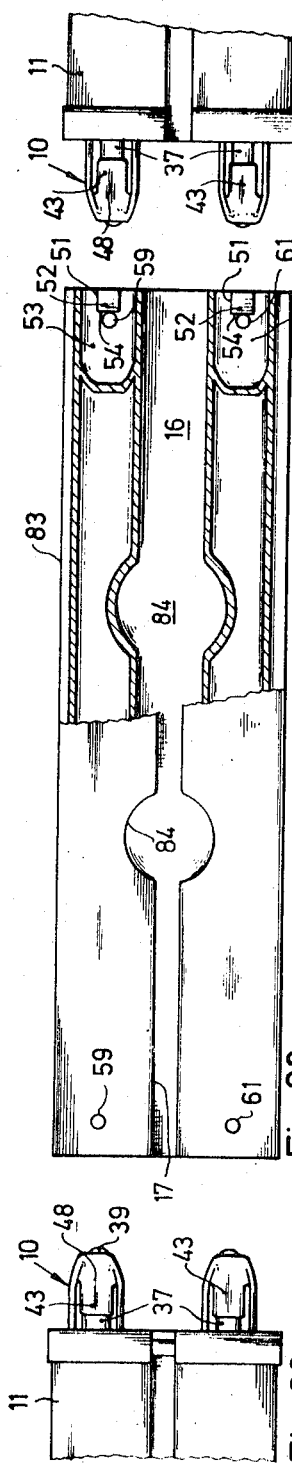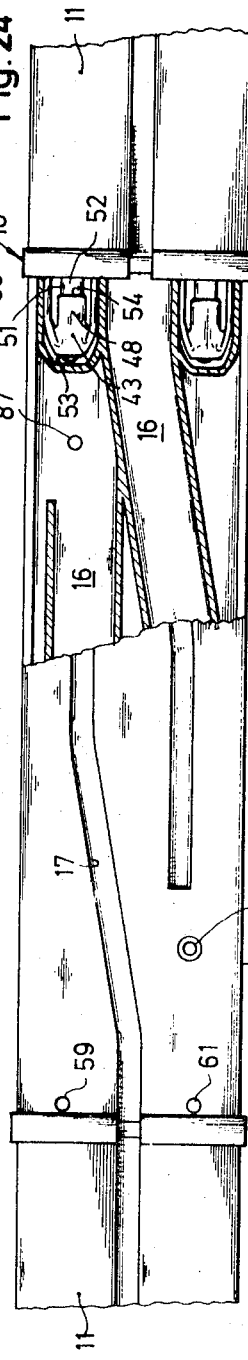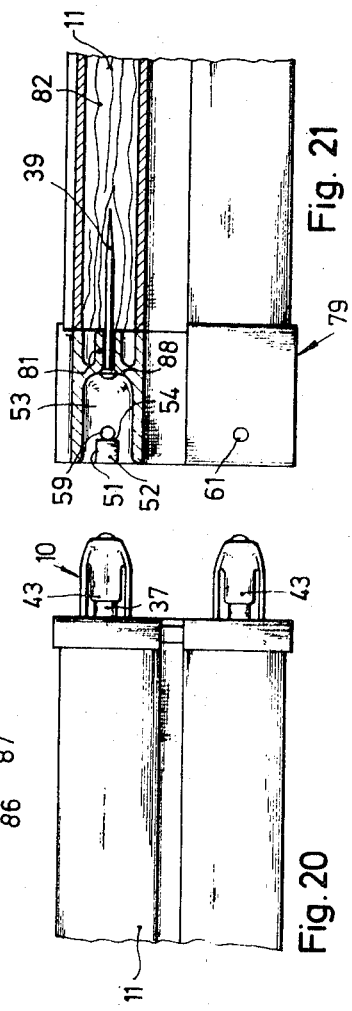

DEVICE FOR CONNECTING CURTAIN RAILS END TO END

The invention relates to a device for connecting two curtain rails end to end, one of which may be of the type having parallel hollow channels connected together on each side of a groove for curtain hooks. The device may be used for connecting a straight curtain rail to an extension piece which may be curved.

Hitherto it was generally impossible to cut portions of the curtain rail precisely to shape at the assembly point so that they fitted together. In fact a series of standard-length curtain rails was always available. The ends of these standard curtain rails were designed by the manufacturer so that they could be connected to another portion of a curtain rail.

In many cases, however, the standard-length curtain rails were too short or too long. In this event, it was necessary to send the precise measurements of the rails to the manufacturer. With the aid of these measurements the manufacturer then arranged the ends of the curtain rails so that they could be joined together. It is evident in this case that success depends very much on precise measurements.

The object of the invention is to provide a device which prevents the manufacturer from having to prepare the curtain rails for connection, allows the curtain rails to be cut at the assembly point as required and enables the two curtain rails to be connected without special arrangements.

According to the invention there is provided a device for connecting together end to end two curtain rails, comprising a molded plug or finger provided with means enabling its rigid attachment to the end of a first rail and with an outline enabling it to fit into a tube in the second rail or of a separate member attached thereto.

The invention also includes an assembly of the device in combination with and connecting together two such curtain rails.

Preferably the first rail is a straight rail made of plastics material and having a wooden core and wherein the second curtain rail is an insert or extension piece through which the channel runs parallel to the groove. The device can then be simply attached to this wooden core by a nail and it is possible to use the channels, e.g., on the bent portions, which were hitherto useless. In particular, the parts associated with a curtain rail, such as a bent portion, intersection points, a straight portion or the like, can be produced as according to a unit construction system and assembled in position as required, if a universally applicable device is available for connecting.

Preferably the attachment means comprise a tubular passage through the longitudinal axis of the device, and for receiving a nail or pin.

One wall of the device may be formed as a resilient locking member the free end of which is spaced from the base and the root of which is integrally connected to the remainder of the device, the locking member being adapted to engage and lock against a projection or lug in the wall of the channel.

Then the connecting operation consists only in nailing the device firmly to the wooden core and inserting it into the channel where it is rigidly locked. In addition to this locking operation the device can also be simultaneously glued on. It has been shown that connections may be produced by such a step between two curtain rails which are superior in rigidity to the previous, more costly ones.

The cylindrical formation may be surrounded by a cylindrical enclosure piece, and the second rail may be provided with a cylindrical projection adapted to fit into the annular space between the said formation and the cylindrical enclosure piece. An extremely rigid connection is hereby produced without any clearance or play.

Preferably the free end of the cylindrical enclosure has an inwardly projecting locking rib adapted to engage in an annular groove near the base of the said cylindrical projection. In this manner a highly rigid locking connection is produced so as to be nonreleasable from the outside, wherein the locking rib can not only engage inwards but wherein the locking groove also weakens the projection at the base thereby rendering it resilient.

The plug may be integral at its base with a frame, the outline of which corresponds approximately to that of the cross section of the first curtain rail. The frame then acts, as it were, simultaneously as a spacer for two or more plugs, and as a baseplate for the device. It can join several plugs together to form a constructional component depending on what type of curtain rail is suitable.

Preferably the frame is provided with peripheral webs which snugly overlap the curtain rails. The webs may provide the entire device with an even greater rigidity, cover the joints and act as guide pieces.

The device may additionally comprise a molded socket which is complementary to the plug and is provided with means enabling its attachment to the second rail, the plug-receiving channel being formed in the socket. This avoids the necessity for the second rail or extension piece to be provided with an appropriate channel for the plug. If, for example, it is desired to connect two straight curtain rails, these do not usually have a suitable channel for the plug.

One of the rails may be in the form of an insertion piece or adapter piece and is provided with a hole or enlargement of the groove for the insertion of curtain suspension members. It is then possible to dispense with the drilling of the insertion holes in ordinary rails or with the provision of insertion holes, during manufacture of the curtain rail, where it is considered advantageous, although this may prove to be a less suitable point for assembly.

Other advantages and features of the invention are shown in the following description of preferred embodiments. In the drawing:

FIG. 1 is a partial section and underneath view of a first embodiment;

FIG. 2 is a view of FIG. 1 in the direction of arrow A;

FIG. 3 is a section along the line 3—3 in FIG. 1;

FIG. 4 is a view of FIG. 1 in the direction of arrow B;

FIG. 5 is a partial section and underneath view of a straight curtain rail with a wooden core;

FIG. 6 shows a view of FIG. 5 in the direction of arrow C;

FIG. 7 is a broken-away underneath view and partial section of a bent rail portion;

FIG. 8 is a view of FIG. 7 in the direction of arrow D;

FIG. 9 is a longitudinal section through the assembled first embodiment;

FIG. 10 is a longitudinal section through a second embodiment;

FIG. 11 is a longitudinal section through a third embodiment;

FIG. 12 is a longitudinal section through a fourth embodiment;

FIG. 13 is a longitudinal section through a fifth embodiment;

FIG. 13a is a view of FIG. 13 in the direction of arrow A;

FIG. 14 is a longitudinal section through a sixth embodiment;

FIG. 15 is a longitudinal section through a seventh embodiment;

FIG. 16 is a longitudinal section through an eighth embodiment;

FIG. 17 is a longitudinal section through a ninth embodiment;

FIG. 17a is a cross section along the line 17a—17a in FIG. 17;

FIGS. 18 and 19 are sections through a 10th embodiment;

FIGS. 20 and 21 are a partial section and underneath view of a plug connection for two straight curtain rails;

FIGS. 22, 23 and 24 are a partial section and exploded view beneath two curtain rails between which an insert piece is to be placed;

FIG. 25 is a partial section below two curtain rails between which a covered insert is placed.

FIGS. 1, 5 and 7 show together an exploded view of a connecting device and two rails before assembly. A straight curtain rail 11 is to be connected to a bent rail portion 12 by a device 10. To describe the device 10 reference is made firstly to FIGS. 1, 2, 3 and 4. A frame 13 has a somewhat similar shape to the cross section of the curtain rail. For example, the recess 14 corresponds to the groove 16, while the slot 17 corresponds to the slot 18 of said groove. The frame 13 bears a first peripheral web 19 which extends beyond the slot 17 in the form of a peripheral web 21. In addition, there are provided two lateral webs 22 and 23 which have projections 24 on either side of the frame 13, which projections, when assembled, fit in lateral grooves 26, 27 of the curtain rail 11 or the bent rail portion 12. On its upper side in the operative position the frame 13 bears another peripheral web 28 which, however, extends only along one side of the frame 13 (FIG. 3). If the curtain rail 11 and the device 10 are assembled, as shown in FIG. 3, the upper side 29 of the curtain rail 11 is in alignment with the upper side of the web 28. However, the peripheral web 28 is provided with a recess 31 in the bent rail portion 12 so that its upper side 32 is also in alignment.

Fingerlike plugs 33 are molded to the frame 13 and connected thereto by two sidewalls 34, 36 which converge an acute angle to one another. The sidewalls 34, 36 are also connected at the tip of the plug 33. From there extends a cylindrical formation or tube 37 which passes through the interior of the plug device 33 and, at the top, has a seat or support 38 for the head of a nail 39.

As can be seen in FIG. 1, the tube 37 ends at the lower limiting edge of the frame 13 and therefore has a support. Damage is hereby avoided when securing the nail.

The outer two walls of the plug are in the form of resilient locking members 42, 43, each having a locking front piece 44, 46. The wall where the locking member 42 or 43 originates is provided with a flat channel 47 or 48.

Locking projections 49, 51 are provided in the bent rail portion 12 a short distance from its front side. These have a sloping edge 52 which extends upwards like a ramp into a channel or tube 53 of the bent rail portion 12 and then dips perpendicularly in the form of a locking edge 54.

For the purpose of assembly the device 10 is nailed by two nails 39 on to the front of the curtain rail 11 and the bent rail portion 12 slides on to the plug 33 until the locking front piece 44 or 46 is hooked behind the locking edge 54. The whole connection is thereby completed. Therefore, the tools that are required are a hammer and possibly a saw. On account of the shape of the device 10 it is virtually impossible for a layman to make a mistake.

FIG. 9 shows the rail portions assembled and connected. It can be clearly seen that the plug device is fairly long, and that, because the sidewalls 34, 36 converge at an acute angle to one another the curved wall 56 of the groove 16 does not hinder the plugging operation. Furthermore, it can be seen that the projections 24 engage in the lateral grooves 26 or 27.

In the embodiment of FIG. 10 the locking projection 51 has been moved nearer to the front of the bent rail portion 12. A hole 59, 61 has been provided in the upper wall 57 and the lower wall 58 respectively. Through this hole it is possible to press against the resilient locking members 42, 43 with insertion tools 62, 63, which may simply be nails, so that the locking members are released from the associated locking edges 54. Then the connection can be released again.

FIG. 10 also shows that the straight curtain rail 11 may consist entirely of wood (instead of having a wooden core). Moreover, FIG. 10 shows that it is not always necessary to provide a frame 13. In fact, it is possible to use the plugs 33 individually.

FIG. 11 shows another embodiment wherein it is not always necessary to use locking projections. Locking recesses 64, 66 have been provided here in the walls 57, 58. In this case the channels 47, 48 can be omitted from FIGS. 1, 2 and 3. It is also provided that the resilient locking members 42, 43 can be disengaged by means of tools 62, 63.

According to FIG. 12 the tube 37 is integral with a first cylindrical cover or enclosure 67 and attached to the wooden core 41 by the nail 39. The free end of the cylindrical cover has an annular catch 68 which points inwards. Between the tube 37 and the cylindrical cover 67 is produced an annular space 69 into which projects a second cylindrical cover or projection 71, attached to the second rail within the tube 53. At the base of this projection 71 there is provided an annular groove 72 in which the catch 68 can engage. In the vicinity of the catch 68 there is provided a sloping edge 73 which, on the one hand, facilitates centering and, on the other hand, causes the cylindrical cover 67 to slide more easily over the projection 71.

FIG. 13 shows an embodiment wherein the tube 37 has a rectangular cross section and is flanked by two tongues 69.

FIG. 14 shows a solid plug 33 on the frame 13. If such a plug is used and the curtain rails are subjected to pull, it is advisable to add adhesive.

FIG. 15 shows a plug 33 which is of hollow construction and not provided with resilient locking members. Instead, all the walls extend down as far as the base 74 of the plug.

FIGS. 16 and 17 show another plug 33 similar to that in FIG. 1, but without a frame.

It is shown in FIGS. 18 and 19 that the plug connection can also be secured by split locking pins 76. The bore for the split pins passes through the upper walls 77 of the bent rail portion 12, through the plug 33, past the tube 37 and finally through the lower walls 78. The bores necessary therefore can be easily, quickly and cleanly produced by a layman.

The bent rail portion 12 shown in FIG. 7 does not differ from those in prior use with the exception of the locking projections 49, 51. However, it is possible to design the channel 53 in the vicinity of the locking projections 49, 51 so that it snugly encloses the plug 33. Then the covering and enclosing of the plug also acts as a reinforcement.

The concentric arrangement shown in FIG. 12 can also be varied according to FIGS. 13 and 13a, i.e., the tube 37 can then be also flanked by tongues provided with stops.

According to FIG. 20 a device 10 is mounted on the left-hand curtain rail 11, as has been described with the aid of FIGS. 1 to 9. However, the left-hand face of the curtain rail 11 shown in FIG. 21 bears a secondary device 79 in the form of a socket with two channels 58 in which the plugs of devices 10 fit. In the channels 53 there are again provided the known locking projections 51 behind which the resilient members 42, 43 can be locked. Moreover, there are also provided the already described holes 59, 61, through which the resilient locking members 42, 43 may be pushed back so that they may be disengaged from the locking projections 49, 51 and the connection released again.

The channels or tubes 53 have a base wall 88 from which a tube 81 extends to the right and as far as the front of the curtain rail 11. A nail 39 is driven through this tube 81, which is located in both channels 53, into a plastics-covered wooden core 82 of the curtain rail 11.

The socket 79 has a frame which, on the front side facing the curtain rail 11, looks exactly the same as the frame of the first device 10. Therefore a view is produced which is almost identical to that in FIG. 4.

According to FIGS. 22, 23, and 24 an insert or adapter piece 83 is to be placed between two curtain rails 11 which are fitted with the first devices 10. The insert piece is, in effect, a second rail. The insert piece 83 has two holes 84 through which curtain suspension members can be introduced or removed in the known manner and which can be closed by a stopper, plug or the like. The insert piece 83 is approximately symmetrical having ends in mirror image relationship. The suspension members can run through a groove 16 and extend downwards, e.g., with a loop through the slot 17.

In the right-hand and left-hand sections of the insert piece 83 there are again channels 53 with locking projections 51 and holes 59 and 61, the effect of which does not need to be described further.

In accordance with the invention it is possible to introduce the insert piece 83 during assembly at that point in the curtain rail 11 which appears to be the correct one for assembly. In addition, the curtain rail 11 is provided with devices 10 at the desired point. This operation may be rapidly performed and then the first devices 10 are locked in the channels 53 of the socket 79.

FIG. 25 shows a covered insert 86 arranged in a similar way. This covered insert 86 has been designed as part of a unit construction system and is used to bring the edge zones of a curtain or the like into an overlapping position. Therefore, there are two grooves 16 provided which bend slightly in the covered insert 86 and overlap one another. Nail holes 87 are provided so that the covered insert 86 can be fastened to a ceiling.

What is claimed is:

1. An assembly of two curtain rails smoothly connected together in endwise relation comprising
    a first rail and a second rail,
    the first rail having at least one sawable end and wall means forming a longitudinally running channel for receiving curtain suspension means and opening at at least one end thereof,
    the second rail comprising wall means forming a longitudinally running tube opening at at least one end thereof and wall means forming a longitudinally running channel for receiving curtain suspension means opening at said end,
    the channels in opposed ends of the rails being in longitudinal alignment,
    a molded plug having two ends,
    and means engaging with the end portion of the sawable first rail to rigidly attach one end of said molded plug,
    the other end of said plug having a configuration which is matingly received by the end portion of the tube of the second rail without interference with the curtain suspension means receiving channel whereby the two rails and their curtain suspension means receiving channels are maintained in smooth and accurate alignment.

2. An assembly as claimed in claim 1 wherein said first rail is a straight rail of plastic outer material and a wooden core and wherein said second rail is an insert piece through which said tube runs parallel to said suspension means receiving channel.

3. An assembly as claimed in claim 1 wherein said rigid attachment means comprises a tubular passage through the longitudinal axis of the molded plug for receiving a nail.

4. An assembly as claimed in claim 1 wherein said tube has a projection extending therein and at least one wall of said molded plug has a resilient locking member the free end of which is spaced from the base of said molded plug and the root of which is integrally connected to the remainder of said molded plug, the locking member being adapted to engage and lock against said projection.

5. An assembly as claimed in claim 1 wherein said molded plug comprises a first cylindrical portion surrounded by a cylindrical enclosure piece, and wherein said tube is provided with a second cylindrical portion adapted to fit into the annular space between first cylindrical portion and said cylindrical enclosure piece.

6. An assembly as claimed in claim 5 wherein the free end of the cylindrical enclosure piece has an inwardly projecting locking rib and said second cylindrical portion has an annular groove near its base adapted for locking engagement with said locking rib.

7. An assembly as claimed in claim 1 wherein said molded plug is integral at its base with a frame the outline of which corresponds approximately to that of the end of said first rail.

8. An assembly as claimed in claim 1 comprising a molded socket which is complimentary to said molded plug and is provided with means enabling its attachment to said second rail, said tube being formed in said molded socket.

9. An assembly as claimed in claim 1 wherein the second rail is in the form of an insertion piece provided with an enlargement of the curtain suspension means receiving channel for the insertion of curtain suspension means.

* * * * *